(12) United States Patent
Vaziri et al.

(10) Patent No.: US 7,500,880 B1
(45) Date of Patent: Mar. 10, 2009

(54) CONNECTOR FOR TELECOMMUNICATION DEVICES

(75) Inventors: Seyamak Vaziri, San Jose, CA (US); Bhaskar Peddinti, Santa Clara, CA (US); Jennifer Kay Walker, San Jose, CA (US); Daniel Eskenazi, Chapel Hill, NC (US); Tony Siu Kong Leung, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 12/115,042

(22) Filed: May 5, 2008

(51) Int. Cl.
*H01R 25/00* (2006.01)
*H01R 27/02* (2006.01)
*H01R 31/00* (2006.01)
*H01R 33/88* (2006.01)
*H01R 33/90* (2006.01)
*H01R 33/92* (2006.01)
*H01R 33/94* (2006.01)

(52) U.S. Cl. .................. 439/638; 439/717; 439/928

(58) Field of Classification Search .................. 439/59, 439/631, 717, 716, 701, 638, 507, 928
See application file for complete search history.

(56) References Cited

U.S. PATENT DOCUMENTS

| 4,401,351 | A | * | 8/1983 | Record ........................ 439/61 |
| 4,658,375 | A | * | 4/1987 | Onogi et al. .................. 710/2 |
| 4,739,451 | A | * | 4/1988 | Kuba .......................... 361/680 |
| 4,790,762 | A | * | 12/1988 | Harms et al. ................. 439/59 |
| 5,645,434 | A | * | 7/1997 | Leung ......................... 439/74 |
| 6,215,419 | B1 | * | 4/2001 | Leman ........................ 341/22 |
| 6,780,064 | B2 | * | 8/2004 | Abel et al. ................... 439/717 |
| 2006/0270284 | A1 | * | 11/2006 | Youden ....................... 439/717 |

\* cited by examiner

*Primary Examiner*—Hae Moon Hyeon
(74) *Attorney, Agent, or Firm*—BainwoodHuang

(57) ABSTRACT

A connector that mechanically connects and provides power to two or more telecommunication devices in series, for example a phone and an expansion module or accessory device, from a single or multiple power source is provided. In one embodiment, the connector includes a support body and a pair of outwardly extending projections for connection to a base and expansion module.

27 Claims, 12 Drawing Sheets

CONNECTOR FOR TELECOMMUNICATION DEVICES

BACKGROUND

Expansion modules are utilized to provide added functionality to telecommunication devices, such as telephones. Modules may provide additional lines and/or programmable buttons to a main phone, or provide for accessory hardware such as thumb print readers or scanners, to name a few examples. Because of the variety of types of users, expansion modules allow for customization in an economical manner. Expansion modules are physically connected to the telephone, either directly connected, or connected via a USB cable, and also work along with the base unit. For example, a key expansion module has additional telephone lines which an operator can choose along with the existing lines on the base phone and also may include additional programmable buttons, for features such as hold, call transfer, etc. In some circumstances, the addition of modules requires the modules to be mechanically supported by the base telephone. In other instances, the modules are self-supporting, for example through a self-supporting stand, and are cabled to the phone. In either case, additional power may be required for added power in order to operate the modules. The connection of modules to a base station has been conventionally achieved by the use of power cords, connection to a USB hub on the phone, and by conventional mechanical fasteners, such as screws and the like.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Overview

The connection of modules to a telecommunication device should be user-friendly in order to allow the user to customize the device as needed, while also being robust to allow for sufficient power to operate the connected modules, and provide for a secure connection of the devices which helps deter the loss of mechanical integrity of the connection if bumped, or otherwise moved. Accordingly, certain embodiments of the present invention are directed to a connector that mechanically connects and provides power to two or more telecommunication devices in series, for example a phone and an expansion module or single or multiple accessory devices, from a single power source. In addition, the connector described herein can be used with accessory devices that provide their own power particularly if accessory device needs additional power in order to function.

In one embodiment, the wireless telecommunications connector assembly includes a main unit having a) a base including a bottom surface; b) a spine supported on the bottom surface; c) a cavity disposed between the bottom surface of the base and the spine; d) a plurality of electrical connectors disposed within the cavity; an accessory unit having: a) a base including a bottom surface; b) a spine supported on the bottom surface; c) a cavity disposed between the bottom surface of the base and the spine; d) a plurality of electrical connectors disposed within the cavity; a connector including: a) a body having a first side and a second side; b) a first projection supported by and extending from the first side of the body and constructed and arranged to be received within the cavity of the main unit, the first projection further including a bottom surface and an opposing top surface; c) a second projection extending from the second side of the body and constructed and arranged to be received within the cavity of the accessory unit, the second projection further including a bottom surface and an opposing top surface; d) a printed circuit board supported within the connector; and e) a plurality of contact plates supported on the top surface of both the first and second projections, the contact plates being electrically connected to the printed circuit board and corresponding in number to the electrical connectors disposed within the cavity of the main unit and the cavity of the accessory unit. In use, upon insertion of the first projection within the cavity of the main unit and insertion of the second projection within the cavity of the second unit, the accessory unit is supported by the projections and the main unit, and the contact plates engage the electrical connectors within the cavity of the main unit and accessory unit to provide electrical power from the main unit to the accessory unit.

DESCRIPTION OF EXAMPLE EMBODIMENTS

Figure 1:
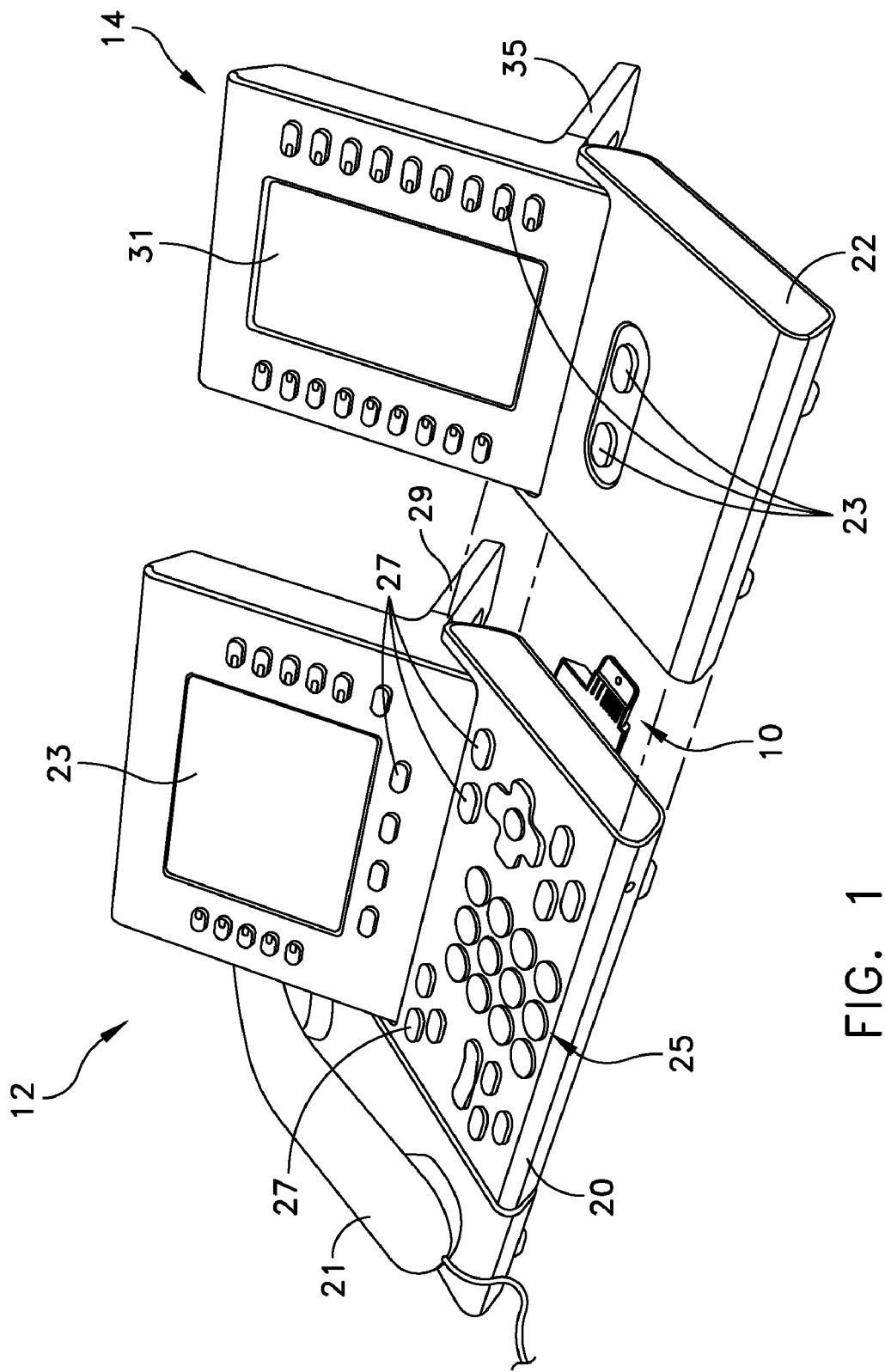
FIG. 1 is a front perspective view of a connector for connecting two telecommunication devices according to a first embodiment
Figure 7:
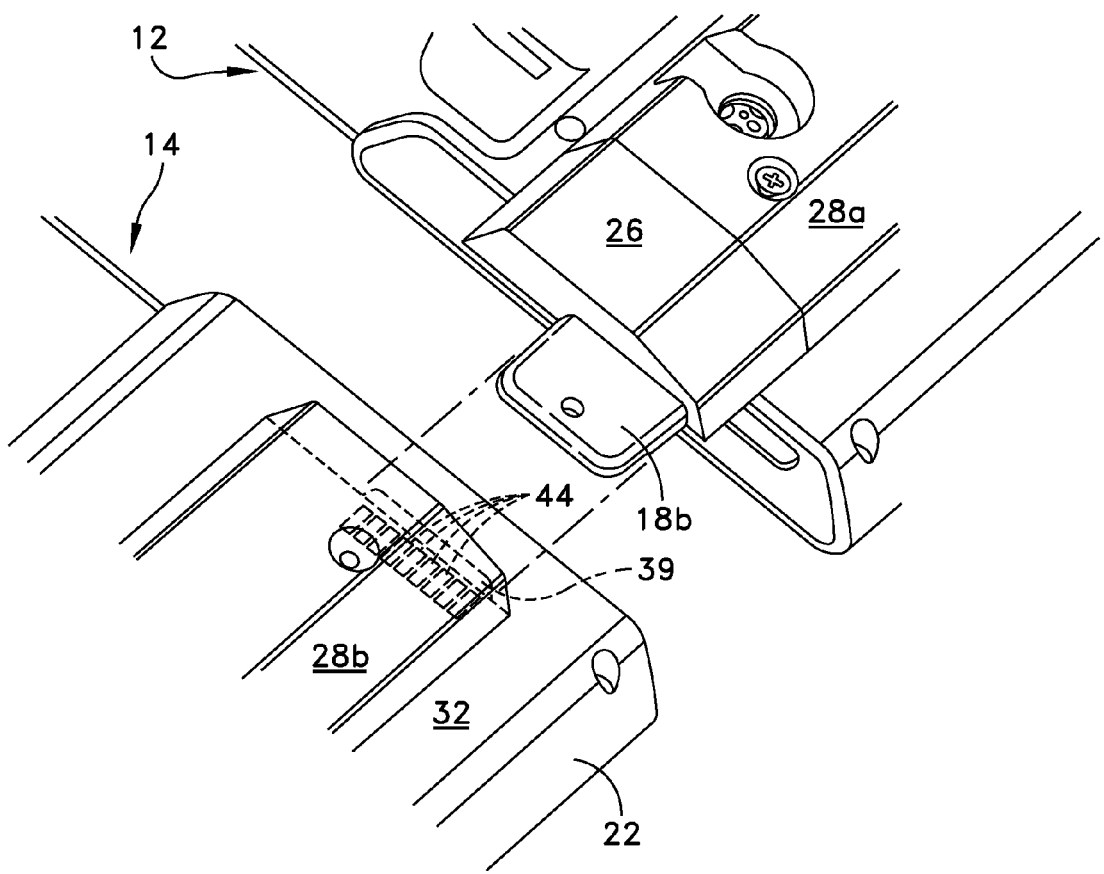
FIG. 7 is an enlarged bottom perspective view of the connector in alignment with the rear of another of the telecommunication devices in preparation for connection.
Figure 8:
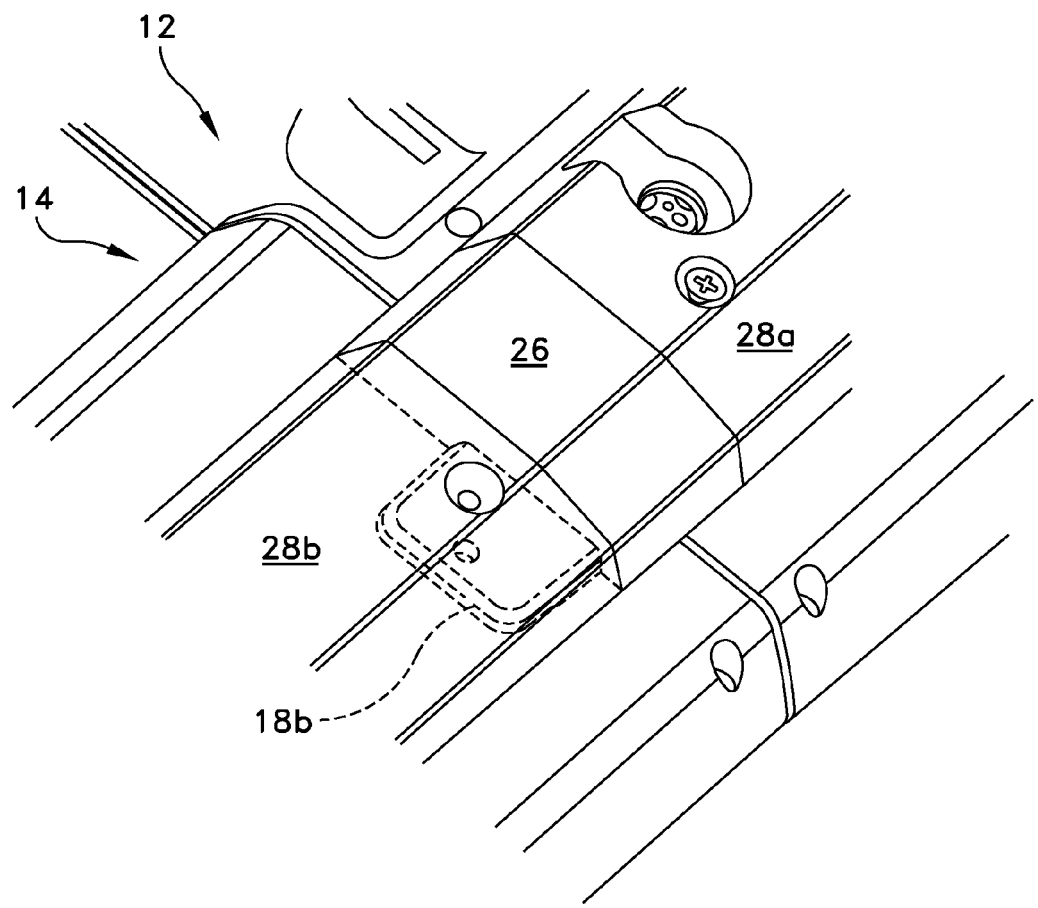
FIG. 8 is an enlarged bottom perspective view of the connector of FIG. 7 after insertion.
Figure 9:
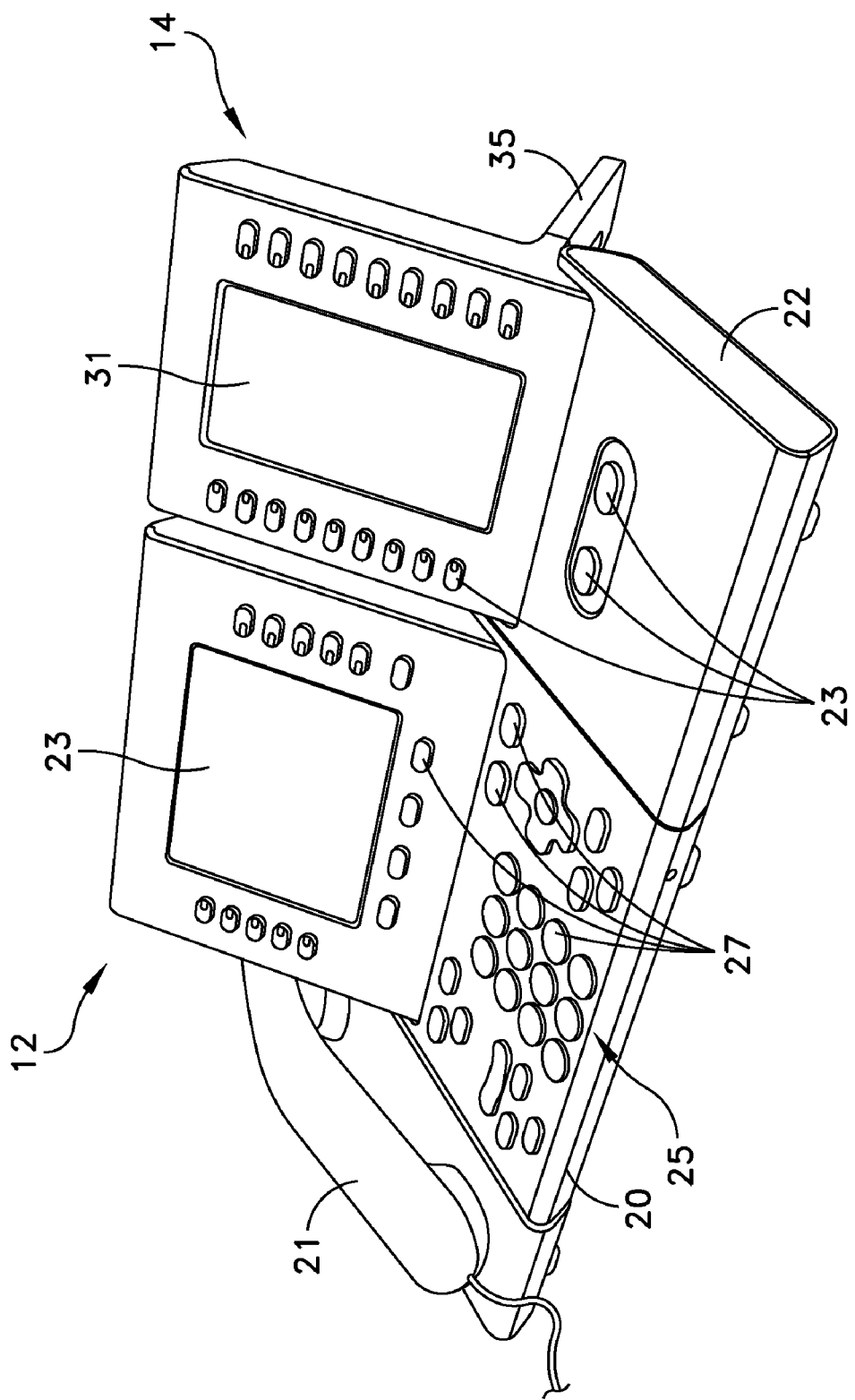
FIG. 9 is a front perspective view of the two telecommunications devices after connection.
Figure 10:
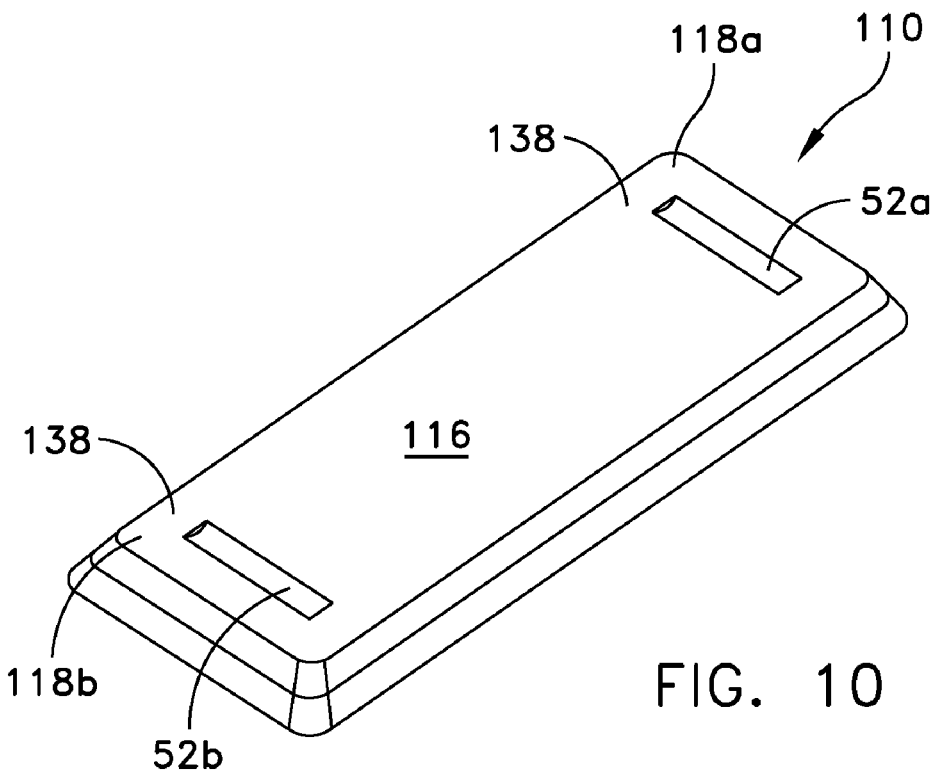
FIG. 10 is a top perspective view of a connector for connecting two telecommunication devices according to a second embodiment.
Figure 11:
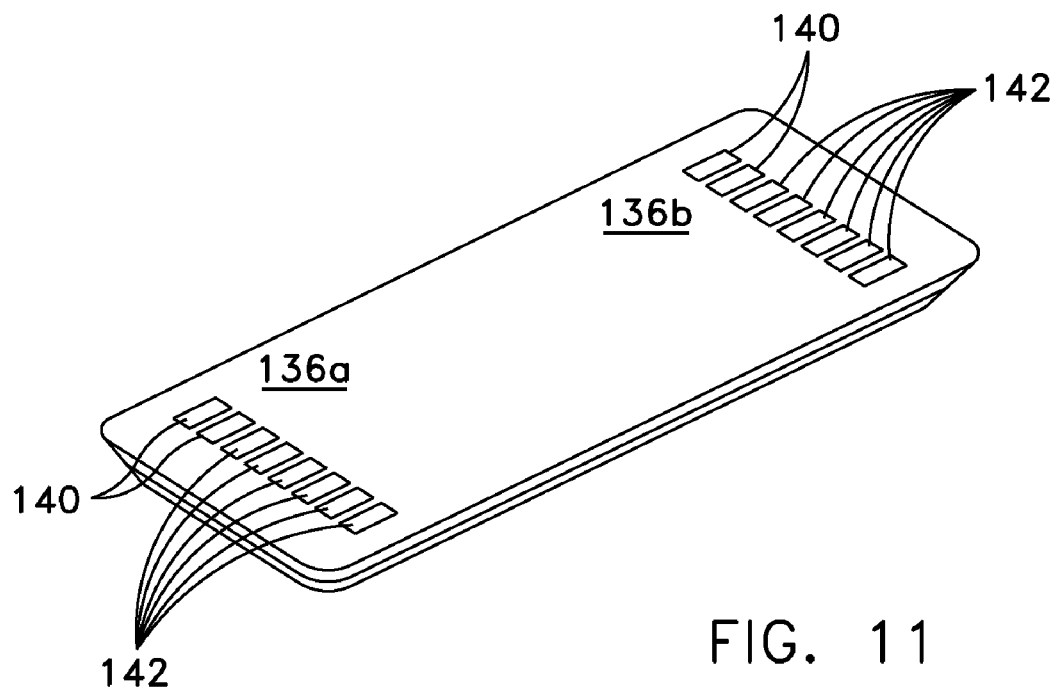
FIG. 11 is a bottom perspective view of the connector of FIG. 10.
Figure 12:
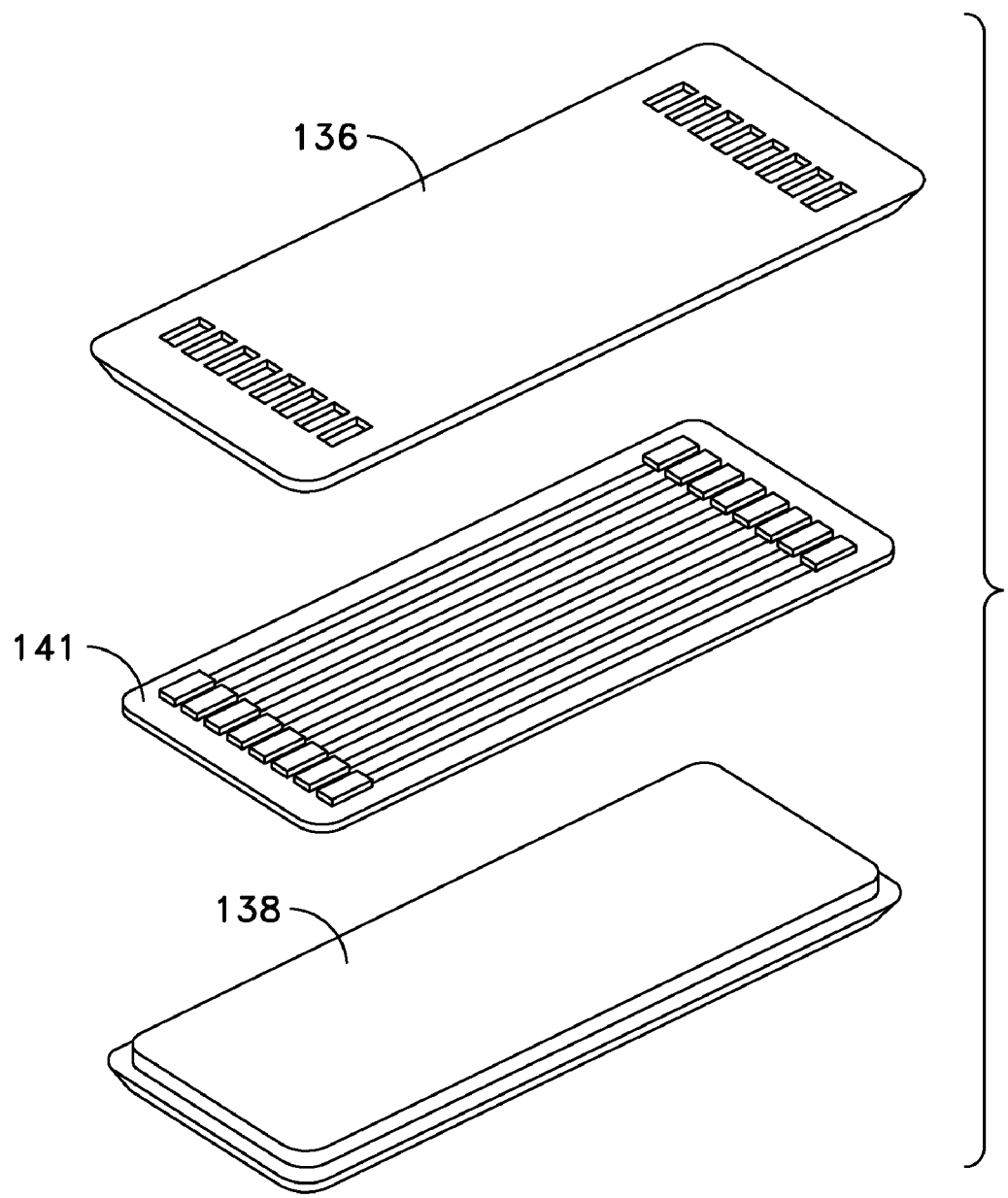
FIG. 12 is an exploded view of the connector of FIG. 10.
Figure 13:
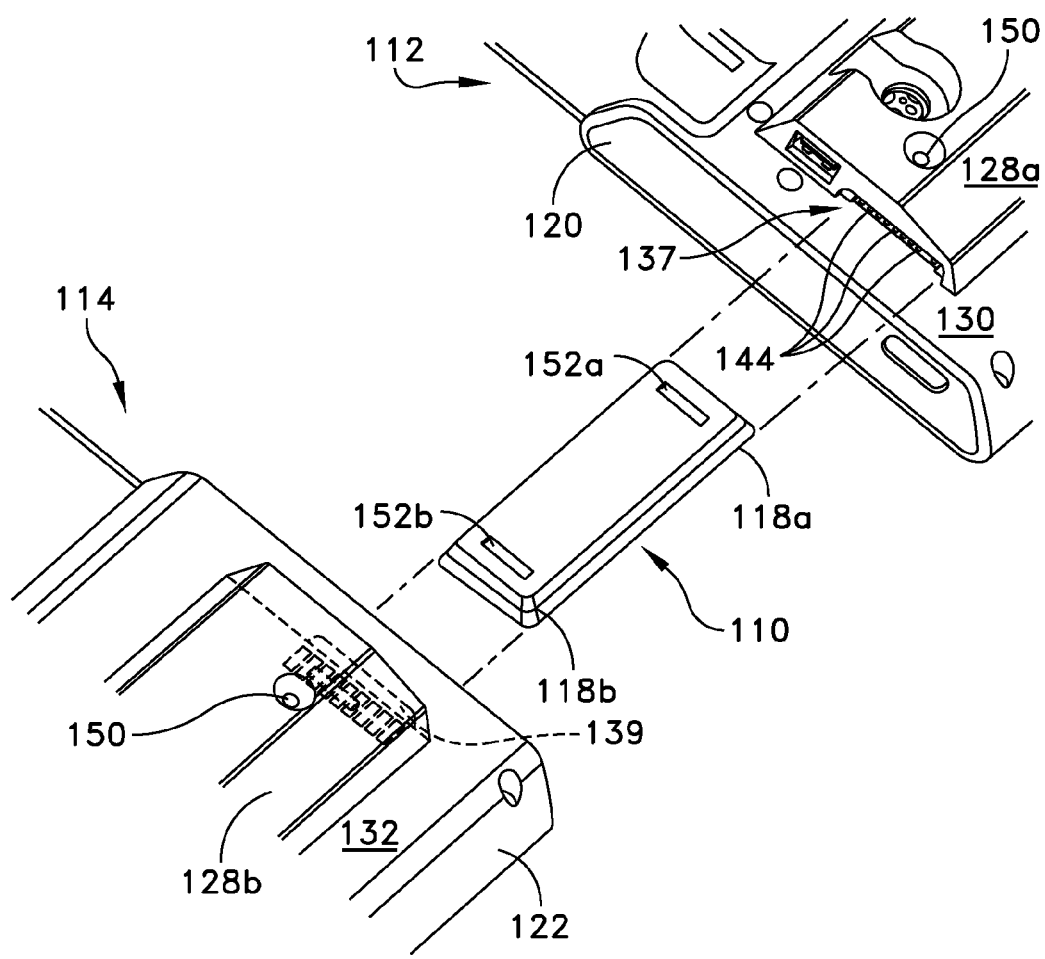
FIG. 13 is an enlarged bottom perspective view of the connector of FIG. 10 in alignment with the rear of the telecommunication devices in preparation for connection.

The embodiments disclosed herein relate to a connector for mechanically supporting and electronically connecting two or more telecommunication devices. As used herein, the term "telecommunications devices" is used in the conventional manner to mean any device that can transmit information, such as words, sounds or images over distances, usually in the form of electronic signals. Although described herein as a "telephone" it is expressly understood that the telecommunication base device is not limited to a conventional telephone, and may include other telecommunication devices, as would be known to those of skill in the art. As also used herein the terms "module" and "accessory" are used interchangeably and refer to any electronic modules, accessories, components, hardware, and/or equipment, that can be used in combination with a primary base station, including but not limited to key expansion modules, biometric fingerprint readers, bar code readers, camera and keyboards and the like, as would also be known to those of skill in the art. As also used herein, the term "wireless" is used to mean a connection that does not rely on external wires and/or cables to provide an electrical connection between two telecommunications devices, although external wires and cables may be utilized for other purposes or in addition to the connector. Referring now to FIGS. 1-9 a first exemplary embodiment of a connector 10 for mechanically supporting and electrically connecting two or more telecommunication devices 12, 14 from a single power source is illustrated. The connector is preferably wireless and allows one or more accessory units to be connected to a main unit in series. In the present embodiment, the connector 10 includes a support body 16 (FIG. 2), a first outwardly extending projection 18a for connection to the base or main unit, such as telephone 12, and a second outwardly extending projection 18b for connection to an expansion module or accessory unit 14, such as key expansion module. The telephone main unit 12 and key expansion module 14 are provided for illustration only and may be readily varied as would be known those of skill in the art. As best shown in FIGS. 1 and 8, the telephone main unit 12 of the present embodiment may include a base 20, a handset 21, a screen 23, a dialing pad 25, multiple function buttons 27, and a footrest 29. The bottom of the base 20 may also include a spine 28a (FIGS. 4-7). In the present embodiment, module 14 includes a base 22, a screen 31, multiple function buttons 33, a footrest 35, as well as a spine 28b. The connector 10 provides mechanical support so as to connect the base 22 of the module 14 to the base 20 of the telephone main unit 12 in a removable, but secure manner, as described in greater detail below. The main unit 12 preferably includes a user interface that can include indication of the particular accessory that is being attached. The user interface can be used to configure, control and interact with the accessory module 14. The user interface can have an accessory mode where the accessory function is displayed on a portion of the screen. In addition, the accessory module may also include its own user interface, for interaction and control of the accessory. Status and control messages may be passed between the devices, which may include, for example, the number of accessories connected, unsupported accessories, power denial, and confirmation of insertion and removal of the accessories. The user interface may also notify the user of any restrictions on device removal and times that devices were connected and/or removed. Data may be exchanged between the accessory and base unit for performing operations related to both base unit and accessory, and can be initiated by either the accessory or base unit.

Figure 2:
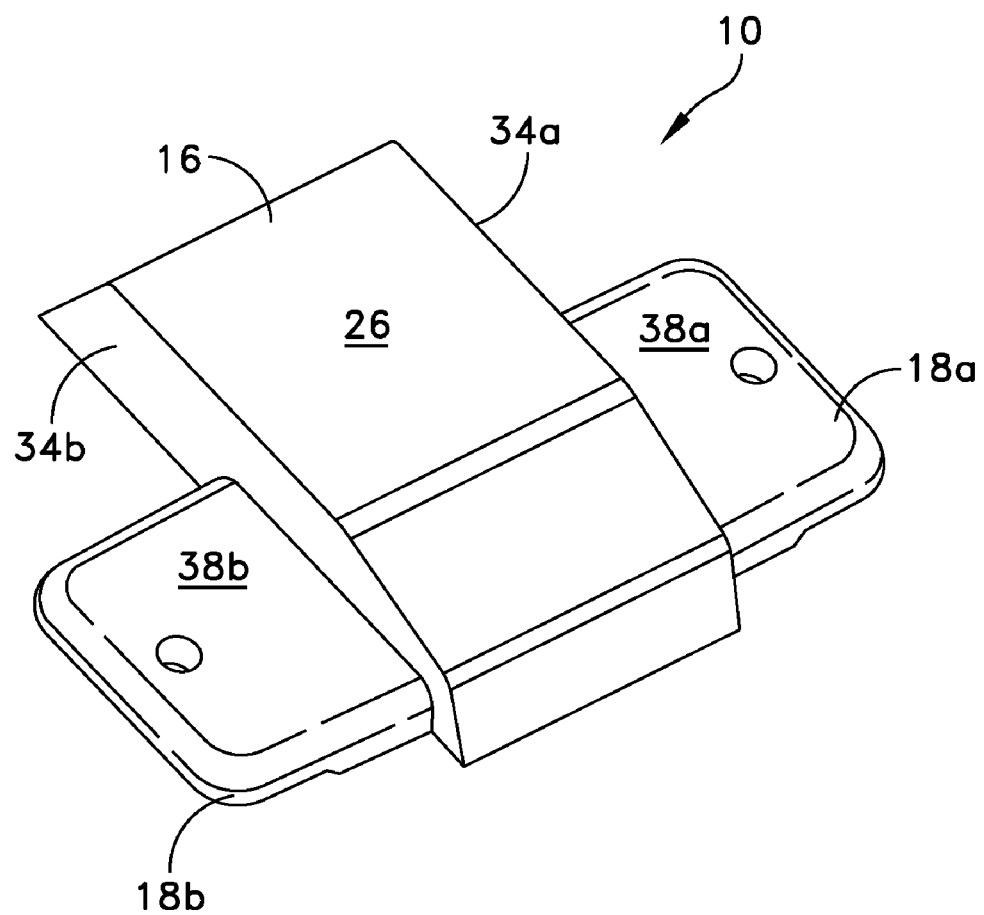
FIG. 2 is a top perspective view of the connector of FIG. 1.
Figure 3:
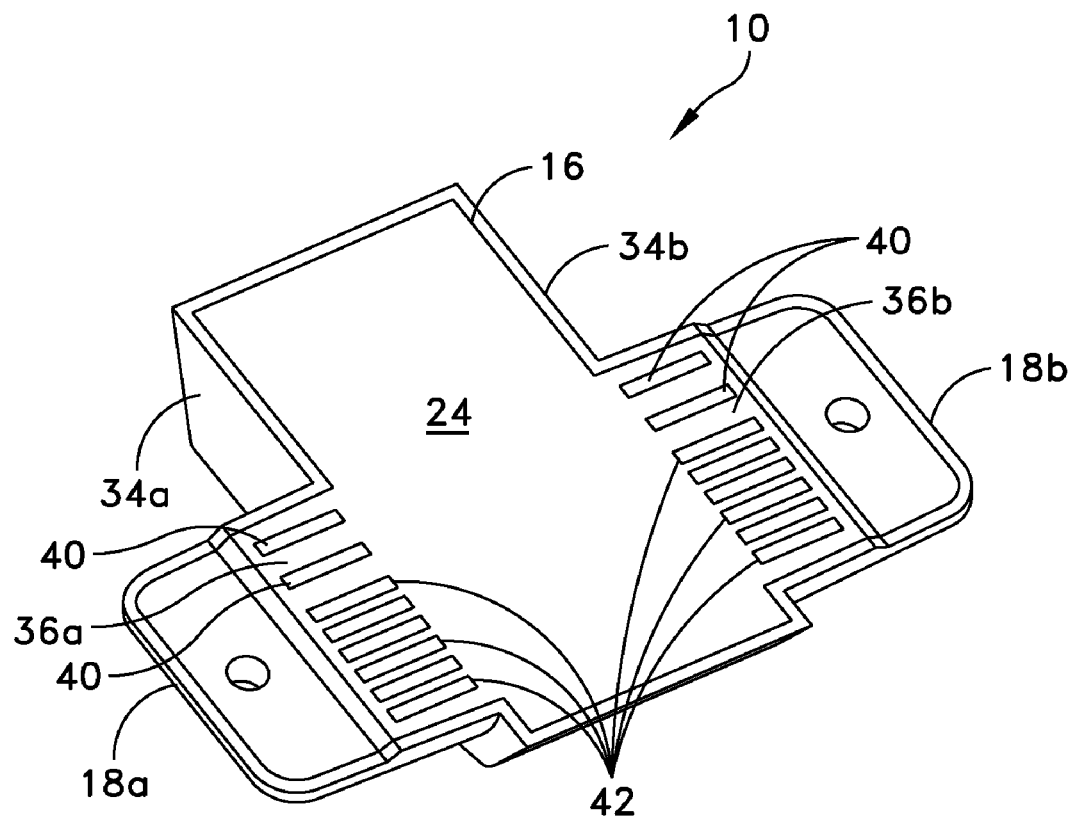
FIG. 3 is a bottom perspective view of the connector of FIG. 1.
Figure 4:
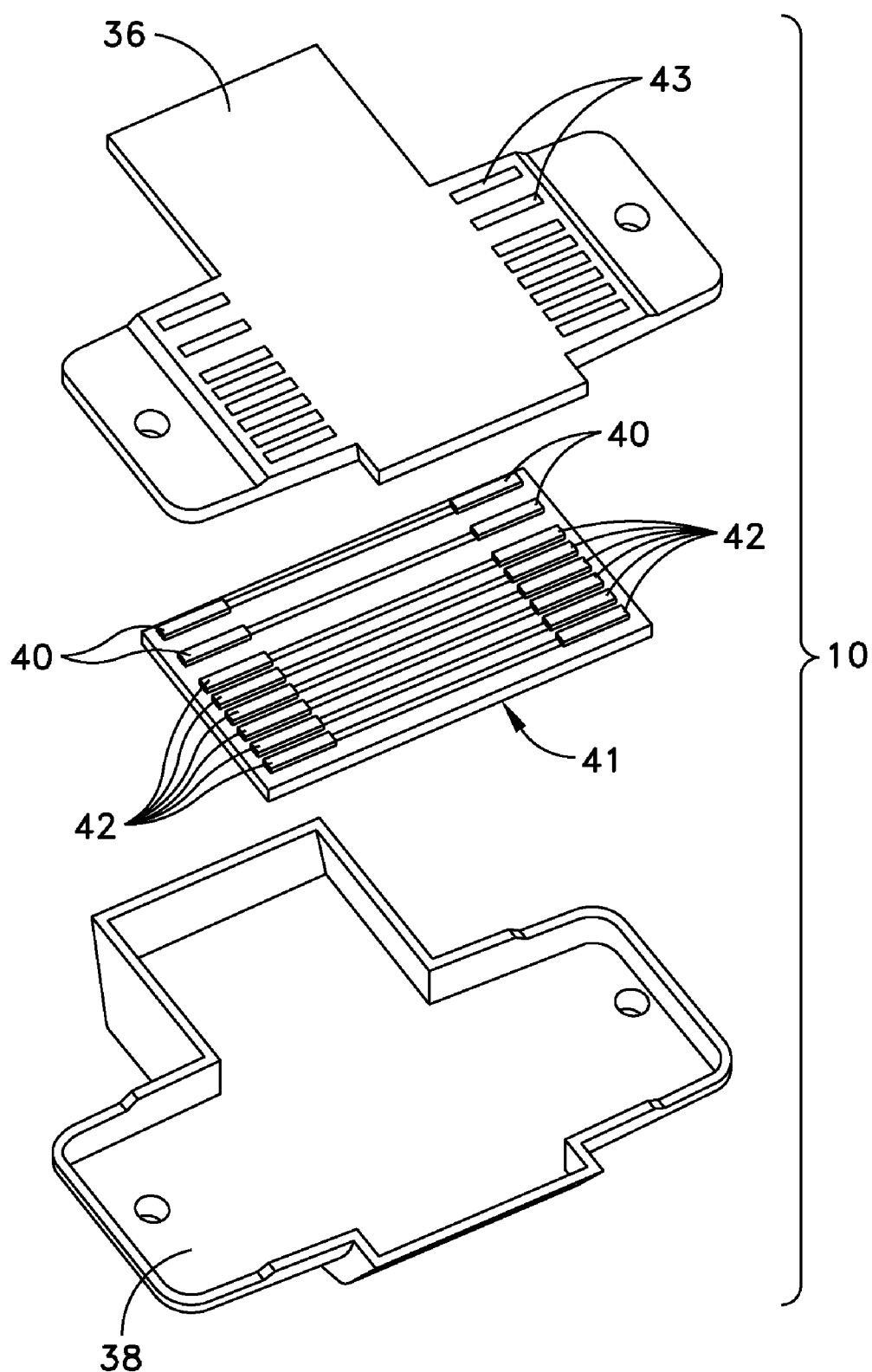
FIG. 4 is an exploded view of the connector of FIG. 2.

As illustrated in FIGS. 2 and 3, the body 16 of connector 10 includes a first, bottom surface 24 which may be generally flat and a second, top surface 26 which preferably has a profile to correspond to the profile of the spine 28 of the devices to which it is to be connected. In use, a portion of the bottom surface 24 of the body abuts a corresponding rear, bottom surface 30 of the base 20 of phone 12 (FIG. 5) and a portion of the bottom surface 24 abuts a rear, bottom surface 32 of the base 22 of module 14 (FIG. 7). The profile of the top surface 26 may be chosen to match the profile of the spines 28a, 28b of the telephone and module as best shown in FIG. 8, and to provide support when placed on a flat surface. An exemplary profile is illustrated, but may be varied according to the device, as would be known to those of skill in the art. However, within a particular brand of equipment the profile is intended to be standard between the various component devices. Body 16 also provides support to the first and second outwardly extending projections 18a, 18b which extend from a first and second side of the body 34a, 34b, respectively. The projections may be symmetrical, as illustrated, or may have different shapes and/or sizes to differentiate the first projection 18a from the second projection 18b.

Figure 5:
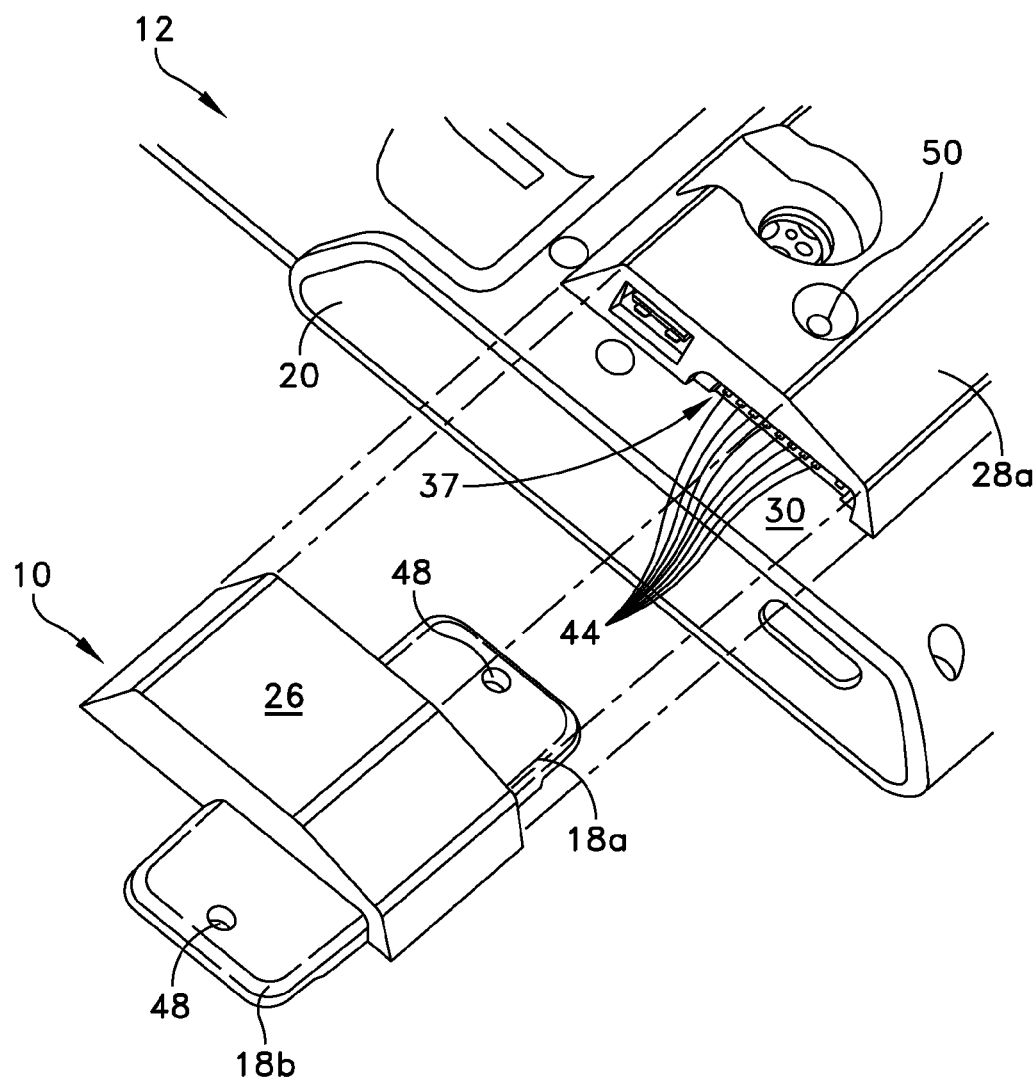
FIG. 5 is an enlarged bottom perspective view of the connector in alignment with the rear of one of the telecommunication devices in preparation for connection.
Figure 6:
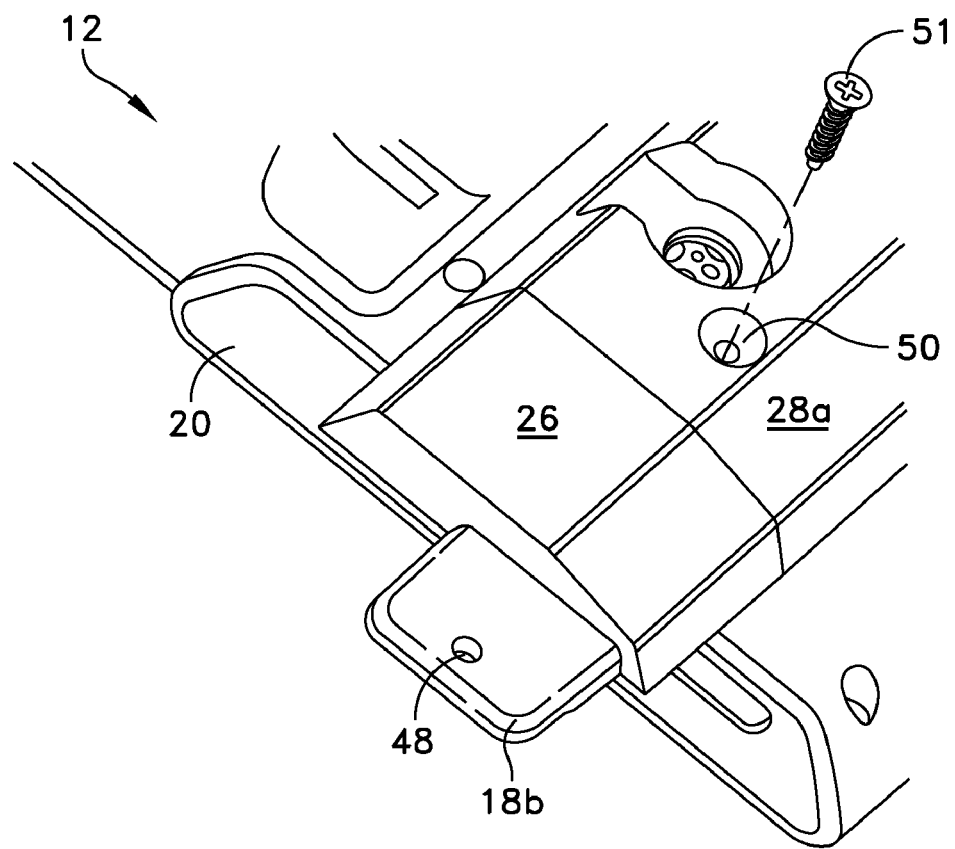
FIG. 6 is an enlarged bottom perspective view of the connector of FIG. 5 after insertion within one of the telecommunication devices.

The first projection 18a is sized for insertion within a cavity 37 formed between the spine 28a and bottom surface 30 of the telephone (FIG. 5). Likewise, the second projection 18b is sized for insertion within a cavity 39 formed between the spine 28b and bottom surface 32 of the module 14 (FIG. 7). Each projection preferably includes an inner contact portion 36a, 36b and an opposing, outer portion 38a, 38b. Together, the inner contact portions 36a, 36b and outer portions 38a, 38b form the housing of the projections. As illustrated, the projections 18a, 18b have a low profile for insertion within the cavities 37, 39 and are generally not visible once inserted within the cavities 37, 39 for a streamlined outer appearance. Disposed within the body 16 of the connector and the inner and outer portions 36a, 36b, 38a, 38b is a printed circuit board 41. Printed circuit board includes a plurality of conductive contact plates 40, 42 (e.g., conductive pads of the circuit board) that extend through openings 43 in the inner contact portions 36a, 36 and which provide an electrical connection between the telephone 12 and accessory unit 14. Alternatively, contact plates 40, 42 may provide an electrical connection through intermediate contact pads, for example disposed within the contact portion 36a, 36b of the projections 18a, 18b, and not directly contact the electrical connectors supported on the telephone and accessory units, as would be known to those of skill in the art. In the present embodiment, the memory and processor capabilities are supported within the base unit of the phone 12 and are not carried by the circuit board, although memory and processor capabilities could be added to the circuit board, if desired. The accessory unit may provide a pass-through of the signaling of a standard USB on the accessory for chaining to a standard USB device. An accessory can also be a hub that passes through the signaling to provide multiple USB connectors on the accessory.

Contact plates 40 provide a power connection between the telephone and module, while contact plates 42 provide a data connection between the telephone and module. In the present embodiment, the contacts 40, 42 are gold-plated for greater conductivity and a pair of power contacts 40 are provided on each projection while six data contacts 42 are provided on each projection. As illustrated, power contacts have a larger spacing between the contacts than the data contacts, and are designed to provide power based upon the needs of the particular module. Thus, the power adapts according to the particular requirements depending upon the number and types of accessory units 14 attached to the base unit 12. In the present embodiment, the power provided through the contacts is from zero to about 20 watts, and could be more if desired. As will be appreciated, the power contacts 40 and data contacts 42 may be designed according to the particular application's needs, namely power requirements and data requirements, and correspond in number and size to corresponding electrical connectors 44 supported on the base of the accessory unit and base unit (FIG. 5). Connectors 44 may be spring loaded and gold plated in order to provide enhanced electrical conductivity with the contacts. To electrically connect the phone 12 to the module 14 through the contact plates 40, 42 and connectors 44, the projections 18a, 18b are inserted within the cavities 37, 39 disposed in the spine of the phone and the module such that the contact plates electrically contact the electrical connectors. The accessories may be hot-plugged and unplugged, while the base unit is powered on, and the power may be staged to successive accessories in the chain if more than one accessory is connected. The base unit may also be configured to only allow enough accessories to attach for the given power supply. In the present embodiment, the base unit may include a protocol to check the accessories to determine if they meet the requirements for attachment, for example if sufficient power is available. The base unit can track if there is insufficient power due to attachment of accessories that consume too much power, and then issue a warning that at least one accessory needs to be removed. If the accessory is not allowed for attachment, then the accessory may not be enabled. In addition, the accessories may optionally include an identifier to allow secure attachment for the particular assembly to the particular base unit.

To further secure projections within the cavities a closure device, such as a fastener, may be utilized. In the present embodiment, a hole 48 is formed in each of the projections that correspond to a hole 50 formed in the base of the main and module units. The holes 48, 50 are sized and configured to receive a fastener, such as a screw 51, in order to further secure the projections within the cavities. Alternatively, other securement members may be utilized, such as a tab and stop, or the like, as known to those of skill in the art. Once the fasteners are secured, the module is mechanically attached to the base in a secure, yet removable manner that can easily be achieved by the end user. In addition, the provision of the contact pads and connectors provides for an electrical connection without the use of external cords or an additional power supply.

Use of the connector 10 will now be described with particular reference to FIGS. 5-9. In use, top surface 26 of the connector is aligned with the spine 28a of the main telecommunication device 12 such that the projection 18a is aligned with the opening 37 in the spine, as shown in FIG. 5. The projection 18a is then slid into the opening 37 so that the contact plates 40, 42 engage the connectors 44 disposed within the opening 37 and overcome the spring force of the connectors 44. In this manner, the projection 18a is seated within the opening 37 with the contact plates 40, 42 and connectors 44 in electrical communication. In this position, a portion of the bottom surface 24 of the body of the connector abuts a portion of the rear, bottom surface 30 of the base of the telecommunications device for added support. A fastener, such as screw 51, may also be inserted within corresponding openings in the bottom surface 24 of the body and projection 18a to further secure the connector to the device.

This process is then repeated with the second projection 18b and the second telecommunication device 14, as shown in FIG. 7. Again, the top surface 26 of the connector is aligned with the spine 28b of the second telecommunication device such that the projection 18b is aligned with the opening 39 in the spine 28b. The projection 18b is then slid into the opening 39 so that the contact plates 40, 42 engage the connectors 44 disposed within the opening 39 and overcome the spring force of the connectors 44. The projection 18b is seated within the opening 39 with the contact plates 40, 42 and connectors in electrical communication and a portion of the bottom surface 24 of the body of the connector abuts a portion of the rear, bottom surface 30 of the base of the telecommunications device for added support. A fastener may also be utilized to further secure the connector to the device. Once installed, the connector provides for a secure attachment of the two telecommunication devices without the need for external cords, additional external power, and may be easily removed by a user, if needed.

Referring now to FIGS. 10-13, a second embodiment of a connector for use with telecommunications devices is provided. In this embodiment, the same or similar components as FIGS. 1-9 are labeled with the same reference numbers, preceded with the numeral "1". As shown in the figures, the connector 110 has a generally rectangular shape, and the body 116 is formed as a unitary member having the same profile as the projections 118a, 118b. The projection 118a is sized to be inserted within the cavity formed between the spine 128a and bottom surface 130 of the telephone, as described above with respect to the first embodiment. Likewise, the second projection 118b is sized for insertion within the cavity 139 formed between the spine 128b and bottom surface 132 of the module. Each projection includes an inner contact portion 136 and an opposing, outer portion 138.

Together, the inner contact portions 136a, 136b and outer portions 138a, 138b form the housing of the projections. As illustrated, the projections 118a, 118b have a low profile for insertion within the cavities 137, 139 and are generally not visible once inserted within the cavities 137, 139 for a streamlined outer appearance. Disposed within the body of the connector and the inner portions 138a, 138b and outer portions 136a, 136b is a printed circuit board 141 including connector plates 140, 142. As with the first embodiment, some of the plates 140 supply a power connection between the telephone and module, while other plates 142 supply a data connection between the telephone and module. In the present embodiment, the closure device is a snap-fit device including a pair of elongated notches 152a, 152b disposed within the outer portions 138a, 138b of each projection 118a, 118b. The notches 152a, 52b are designed to engage corresponding tabs disposed within the opening of the spine of each connector. In this manner, when the projections 118a, 118b are inserted within their corresponding openings as described above, the notches engage the tabs in a snap-fit arrangement to secure the projections within the openings. Thus, additional fasteners are not utilized in the present embodiment. Use of the connector will now be described with reference to FIGS. 10-13.

In use, top surface 126 of the connector is aligned with the spine 128a of one of the telecommunications devices such that one of the projections 118a is aligned with the opening 137 in the spine. The projection 118a is then slid into the opening 137 so that the contact plates 140, 142 engage the connectors 144 disposed within the opening 137 and overcome the spring force of the connectors, and the notch 152a is inserted to engage with the corresponding projection in a snap-fit arrangement. In this manner, the projection 118a is secured within the opening and the contact plates and connectors in electrical communication.

This process is then repeated with the second projection 118b and the second telecommunication device. Again, the top surface 126 of the connector is aligned with the spine 128b of the second telecommunication device such that the other of the projections 118b is aligned with the opening 139 in the spine 128b. The projection 118b is then slid into the opening 139 so that the contact plates 140, 142 engage the connectors disposed within the opening and overcome the spring force of the connectors and the notch 152b is inserted to engage with the corresponding projection in a snap-fit arrangement. In this manner, the projection 118b is secured within the opening and the contact plates and connectors in electrical communication.

While various embodiments of the invention have been particularly shown and described, it will be understood by those skilled in the art that various changes in form and details may be made therein without departing from the spirit and scope of the invention as defined by the appended claims. For example, the number and size of the electrical contacts may be varied and the configuration of the circuit board may also be varied to include more options such as memory and processor capabilities. Likewise, the shape and size of the body of the connector may be varied according to the particular telecommunications device.

What is claimed is:

1. A telecommunications connector comprising:
   a body;
   a first projection extending from one side of the body and constructed and arranged to be secured to a telecommunication device main unit through a cavity in the main unit, the first projection further including a bottom surface and an opposing top surface;
   a second projection extending from an other side of the body and constructed and arranged to be secured to a telecommunication device accessory unit through a cavity in the accessory unit, the second projection further including a bottom surface and an opposing top surface;
   a printed circuit board supported within the connector and including a plurality of contact plates electrically connected to the printed circuit board, the contact plates constructed and arranged to engage at least one electrical port supported on the main unit and at least one electrical port supported on the accessory unit; and
   wherein upon insertion of the first projection within the cavity in the main unit and insertion of the second projection within the cavity in the accessory unit, the accessory unit is secured to the main unit, and the contact plates are electrically connected to the at least one electrical port supported on the main unit and the at least one electrical port supported on the accessory unit to provide electrical power from the main unit to the accessory unit.

2. The connector of claim 1, wherein the plurality of contact plates include both data contact plates constructed and arranged to transfer data between the main unit and the accessory unit, and power contact plates constructed and arranged to supply power from the main unit to the accessory unit.

3. The connector of claim 2, wherein the power contact plates are constructed and arranged to provide power based upon the needs of the particular accessory unit.

4. The connector of claim 1, wherein the at least one electrical port of the main unit and the at least one electrical port of the accessory unit are spring loaded.

5. The connector of claim 1, wherein the main unit is a telephone.

6. The connector of claim 4, wherein the accessory unit is a key expansion module.

7. The connector of claim 1, wherein the first projection is symmetrical with the second projection.

8. The connector of claim 1, further comprising a fastening mechanism constructed and arranged to further secure the first projection to the base of the main unit and to further secure the second projection to the base of the accessory unit.

9. The connector of claim 8, wherein the fastening mechanism includes:
   a) a first set of openings including an opening disposed in the first projection and a corresponding opening disposed in the body of the main unit;
   b) a second set of openings including an opening disposed in the second projection and a corresponding opening disposed in the body of the accessory unit;
   c) a first fastener configured and dimensioned to fit within the first set of openings; and
   d) a second fastener configured and dimensioned to fit within the second set of openings.

10. The connector of claim 8, wherein the fastening mechanism includes an elongated notch disposed in each of the first projection and second projection, and corresponding tabs supported by the body of the main unit and the body of the accessory unit, the tabs constructed and arranged to engage the notches in a snap-fit arrangement when the first projection is inserted within the cavity of the main unit and the second projection is inserted within the cavity of the accessory unit.

11. An assembly comprising:
    a main unit having:
      a) a base including a bottom surface;
      b) a spine supported on the bottom surface;
      c) a cavity disposed between the bottom surface of the base and the spine;
      d) a plurality of electrical ports disposed within the cavity of the main unit;
    at least one accessory unit having:
      a) a base including a bottom surface;
      b) a spine supported on the bottom surface;
      c) a cavity disposed between the bottom surface of the base and the spine;
      d) a plurality of electrical ports disposed within the cavity of the accessory unit;
    a connector including:
      a) a body having a first side and a second side;
      b) a first projection extending from the first side of the body and constructed and arranged to be received within the cavity of the main unit, the first projection further including a bottom surface and an opposing top surface;
      c) a second projection extending from the second side of the body and constructed and arranged to be received within the cavity of the accessory unit, the second projection further including a bottom surface and an opposing top surface;
      d) a printed circuit board supported within the connector and including a plurality of contact plates electrically connected to the printed circuit board, the contact plates constructed and arranged to engage at least one electrical port supported on the main unit and at least one electrical port supported on the accessory unit; and
    wherein upon insertion of the first projection within the cavity in the main unit and insertion of the second projection within the cavity in the accessory unit, the accessory unit is secured to the main unit, and the contact plates are electrically connected to the at least one electrical port supported on the main unit and the at least one electrical port supported on the accessory unit to provide electrical power from the main unit to the accessory unit.

12. The assembly of claim 11, wherein the plurality of contact plates include both data contact plates constructed and arranged to transfer data between the main unit and the at least one accessory unit and power contact plates constructed and arranged to supply power from the main unit to the at least one accessory unit.

13. The assembly of claim 12, wherein the power contact plates are constructed and arranged to provide power based upon the needs of the at least one accessory unit.

14. The assembly of claim 11, wherein the at least one electrical port of the main unit and the at least one electrical port of the at least one accessory unit are spring loaded.

15. The assembly of claim 11, wherein the main unit is a telephone.

16. The assembly of claim 15, wherein the at least one accessory unit is a key expansion module.

17. The assembly of claim 11, wherein the first projection is symmetrical with the second projection.

18. The assembly of claim 11, further comprising a user interface provided on at least one of the main unit and the at least one accessory unit, the user interface being constructed and arranged to provide information to a user about the at least one accessory unit and main unit upon securing the at least one accessory unit to the main unit.

19. The assembly of claim 18, wherein the user interface is constructed and arranged to exchange data between the at least one accessory unit and main unit in order to configure and control interactions between the main unit and the at least one accessory unit.

20. The assembly of claim 18, wherein the user interface identifies the number of the accessory units connected, provides confirmation of insertion and removal of the accessory units, notifies the user of any restrictions on the accessory unit removal and times that the accessory units were connected and removed.

21. The assembly of claim 11, further comprising a fastening mechanism constructed and arranged to further secure the first projection to the base of the main unit and to further secure the second projection to the base of the at least one accessory unit.

22. The assembly of claim 21, wherein the fastening mechanism includes:
 a) a first set of openings including an opening disposed in the first projection and a corresponding opening disposed in the body of the main unit;
 b) a second set of openings including an opening disposed in the second projection and a corresponding opening disposed in the body of the at least one accessory unit;
 c) a first fastener configured and dimensioned to fit within the first set of openings; and
 d) a second fastener configured and dimensioned to fit within the second set of openings.

23. The assembly of claim 21, wherein the fastening mechanism includes an elongated notch disposed in each of the first projection and second projection, and corresponding tabs supported by the body of the main unit and the body of the at least one accessory unit, the tabs constructed and arranged to engage the notches in a snap-fit arrangement when the first projection is inserted within the cavity of the main unit and the second projection is inserted within the cavity of the at least one accessory unit.

24. A method for connecting a telecommunications accessory unit to a telecommunications main unit comprising:
 providing a connector including a body having:
  a) a first side and a second side;
  b) a first projection extending from the first side of the body and constructed and arranged to be received within a cavity of the main unit;
  c) a second projection extending from the second side of the body and constructed and arranged to be received within a cavity of the accessory unit;
 providing a printed circuit board supported within the connector and including one or more contact plates electrically connected to the printed circuit board;
 inserting the first projection within the cavity of the main unit;
 engaging at least one contact plate with at least one electrical port supported on the main unit;
 inserting the second projection within the cavity of the accessory unit;
 engaging at least one contact plate with at least one electrical port supported on the accessory unit;
 securing the first projection within the cavity of the main unit; and
 securing the second projection within the cavity of the accessory unit.

25. The method of claim 24, further comprising running a check between the main unit and the accessory unit to determine if the accessory unit meets predetermined requirements for attachment to the main unit, and enabling the accessory unit if it meets the predetermined requirements.

26. The method of claim 25, wherein the check includes determining the power requirements of the accessory unit in order to determine if enough power is present to power the accessory unit.

27. The method of claim 24, further comprising providing a user interface on at least one of the main unit and the accessory unit, and passing status and control messages between the main unit and the accessory unit through the user interface.

* * * * *